United States Patent
Nomura et al.

(10) Patent No.: US 12,202,454 B2
(45) Date of Patent: Jan. 21, 2025

(54) ELECTRIC BRAKE DEVICE

(71) Applicant: Hitachi Astemo, Ltd., Ibaraki (JP)

(72) Inventors: Daichi Nomura, Hitachinaka (JP); Takuya Usui, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 371 days.

(21) Appl. No.: 17/620,267

(22) PCT Filed: Jun. 22, 2020

(86) PCT No.: PCT/JP2020/024322
§ 371 (c)(1),
(2) Date: Dec. 17, 2021

(87) PCT Pub. No.: WO2020/262280
PCT Pub. Date: Dec. 30, 2020

(65) Prior Publication Data
US 2022/0396251 A1    Dec. 15, 2022

(30) Foreign Application Priority Data

Jun. 26, 2019  (JP) .................... 2019-118668

(51) Int. Cl.
*B60T 13/74*    (2006.01)
*B60T 1/06*    (2006.01)
(Continued)

(52) U.S. Cl.
CPC ........... *B60T 13/746* (2013.01); *B60T 1/065* (2013.01); *F16D 55/226* (2013.01);
(Continued)

(58) Field of Classification Search
CPC .... B60T 13/746; B60T 13/741; B60T 55/226; B60T 1/065; B60T 17/22;
(Continued)

(56) References Cited

U.S. PATENT DOCUMENTS 10,093,290 B2 * 10/2018 Kotera ...................... B60T 8/17
2017/0291585 A1 * 10/2017 Kobune ................ F16D 55/226
(Continued)

FOREIGN PATENT DOCUMENTS

| JP | 10-181578 | 7/1998 |
| JP | 2008-223914 | 9/2008 |
| JP | 2010-25222 | 2/2010 |

OTHER PUBLICATIONS

Japanese Patent No. JP 2003072527 to Suzuki et al published on Mar. 12, 2003.*

(Continued)

*Primary Examiner* — Pamela Rodriguez
(74) *Attorney, Agent, or Firm* — Wenderoth, Lind & Ponack, L.L.P.

(57) ABSTRACT

Provided is an electric brake device including one caliper including at least two electric mechanisms each configured to apply a braking force to a vehicle and to maintain the braking force. The at least two electric mechanisms are to be driven by one drive circuit output, that is, one output from one drive circuit. In this manner, for example, even when it is required to control a large number of electric mechanisms as in a case in which the electric brake device is applied to a twin-bore caliper, the number of drive circuits for driving the electric mechanisms can be reduced, thereby being capable of reducing cost.

3 Claims, 3 Drawing Sheets

(51) Int. Cl.
  *F16D 55/226* (2006.01)
  *F16D 65/18* (2006.01)
  *F16D 121/24* (2012.01)
(52) U.S. Cl.
  CPC ...... *F16D 65/183* (2013.01); *B60T 2270/402* (2013.01); *B60T 2270/413* (2013.01); *F16D 2121/24* (2013.01)
(58) Field of Classification Search
  CPC ......... B60T 2270/402; B60T 2270/413; F16D 55/226; F16D 65/183; F16D 2055/0066; F16D 2055/0091; F16D 2121/24
  See application file for complete search history.

(56) References Cited

U.S. PATENT DOCUMENTS

2018/0312152 A1 11/2018 Barbosa et al.
2019/0131789 A1* 5/2019 Huang ..................... H02J 3/34

OTHER PUBLICATIONS

German Patent No. DE 102010026656 to Benzinger et al published on Mar. 10, 2011.*
Japanese Patent No. JP 2017140900 to Eguichi et al published on Aug. 17, 2017.*
WO document No. WO 20180620097 to Oikawa et al published on Apr. 5, 2018.*
Japanese Office Action issued Apr. 5, 2023 in corresponding Japanese Patent Application No. 2021-526965, with English machine translation.
Written Opinion of the International Searching Authority issued Jul. 28, 2020, in International Application No. PCT/JP2020/024322, with English translation.
International Search Report issued Jul. 28, 2020 in International Application No. PCT/JP2020/024322, with English translation.

* cited by examiner

ELECTRIC BRAKE DEVICE

TECHNICAL FIELD

The present invention relates to an electric brake device.

BACKGROUND ART

In recent years, introduction of an electric parking brake (EPB) has been promoted in passenger vehicles, but, for example, a large number of large vehicles of 3.5 ton to 6 ton classes adopt a twin-bore caliper as a normal brake and a drum brake as a parking brake in order to ensure a brake force. In view of the above, focusing on a point that the EPB can generate a large thrust force by a motor, it is conceivable to quit using the drum brake and adopt a brake configuration using only a caliper utilizing the EPB, to thereby enhance performance in suspension layout and an advantage in cost (see, for example, Patent Literature 1). In this case, when two EPBs for a passenger vehicle used in a pair can be applied to the twin-bore caliper of the large vehicle, components can be shared, and reduction in cost and man-hours for development can be expected.

CITATION LIST

Patent Literature

PTL 1: US 2018/0312152 A1

SUMMARY OF INVENTION

Technical Problem

In this case, in the passenger vehicle described in Patent Literature 1, one EPB is mounted to each wheel, and a controller includes two drive circuits for driving the respective EPBs. Accordingly, when the two EPBs for a passenger vehicle are directly applied to the large vehicle, four drive circuits are required, which results in increasing the cost. Further, types of the large vehicle include a vehicle type having a battery voltage higher than that assumed in the passenger vehicle. When the EPBs for a passenger vehicle are applied to such a large vehicle, an input voltage cannot be effectively used, and, for example, it is required to re-design the motor in accordance with the input voltage.

The present invention has an object to reduce the cost of the electric parking brake.

Solution to Problem

According to one embodiment of the present invention, there is provided an electric brake device including: an electric mechanism which is to be driven by a drive circuit, and is configured to apply a braking force to a vehicle and to maintain the braking force; and one caliper including at least two electric mechanisms, wherein the at least two electric mechanisms are to be driven by one drive circuit output.

One embodiment of the present invention is configured as described above, and hence the cost of the electric parking brake can be reduced.

DESCRIPTION OF EMBODIMENTS

Now, embodiments of the present invention are described with reference to the drawings. Throughout all of the drawings, common parts are denoted by the same reference symbols.

Figure 1:
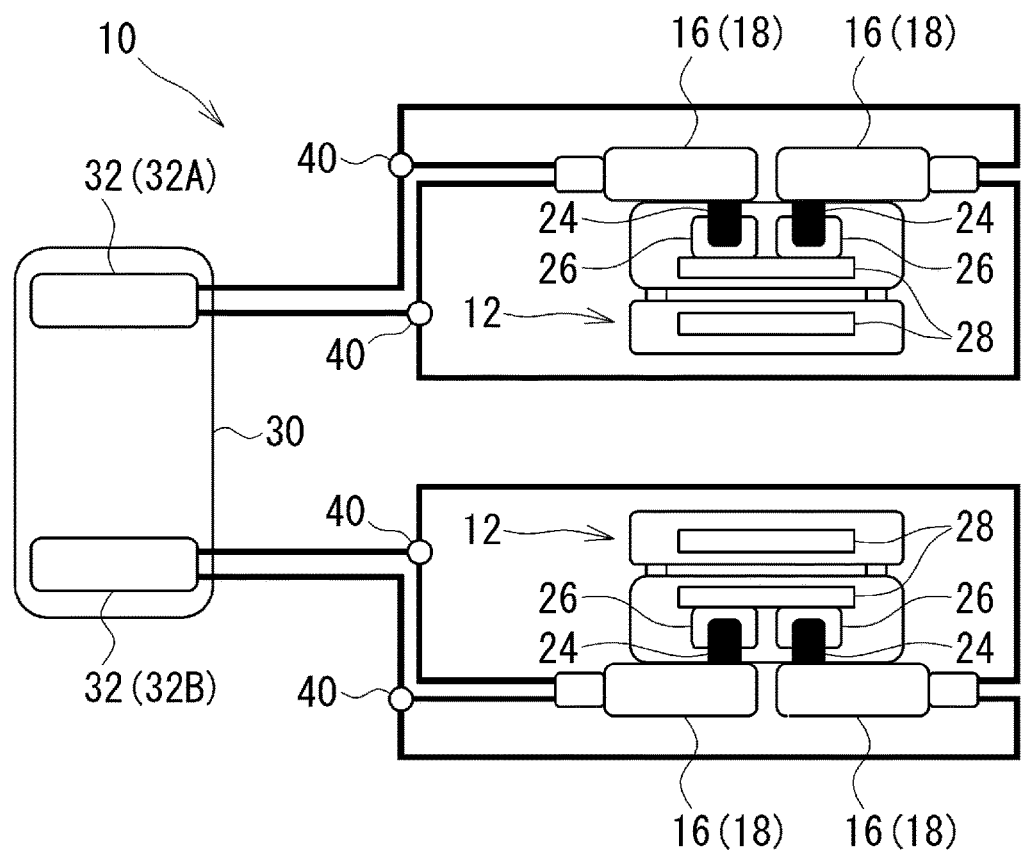
FIG. 1 is a connection image view for schematically illustrating a configuration of a first embodiment of an electric brake device according to an embodiment of the present invention.

As illustrated in FIG. 1, an electric brake device 10 according to an embodiment of the present invention includes calipers 12 and a controller 30. The calipers 12 are provided to right and left wheels, respectively, on a front side or a rear side of a vehicle. The controller 30 is for use in controlling both of the calipers 12. Each of the calipers 12 is a twin-bore caliper, and includes two motor gear units (MGUs) 16. Each of the two MGUs 16 includes, for example, an electric mechanism 18 formed of a brush motor. When this electric mechanism 18 is driven, an output torque of the MGU 16 is converted into a thrust force by an actuator 24 so that a piston 26 is pressed against a brake pad 28. The electric mechanism 18 in this embodiment is assumed to be driven at a voltage of, for example, +12 V, although not limited thereto.

The controller 30 controls the two calipers 12 so as to cause the two calipers 12 to operate as a parking brake, and includes two drive circuits 32, that is, a first drive circuit 32A and a second drive circuit 32B. Each of the first drive circuit 32A and the second drive circuit 32B is connected so as to drive two of the four electric mechanisms 18 provided in total for both of the right and left wheels. Specifically, in the electric brake device 10 of the first embodiment illustrated in FIG. 1, an output of the first drive circuit 32A is connected so as to drive two electric mechanisms 18 included in the caliper 12 of one wheel, and an output of the second drive circuit 32B is connected so as to drive two electric mechanisms 18 included in the caliper 12 of another wheel. More specifically, each of the first and second drive circuits 32A and 32B is connected in parallel to the two electric mechanisms 18 of each caliper 12 via branching points 40.

Figure 2:
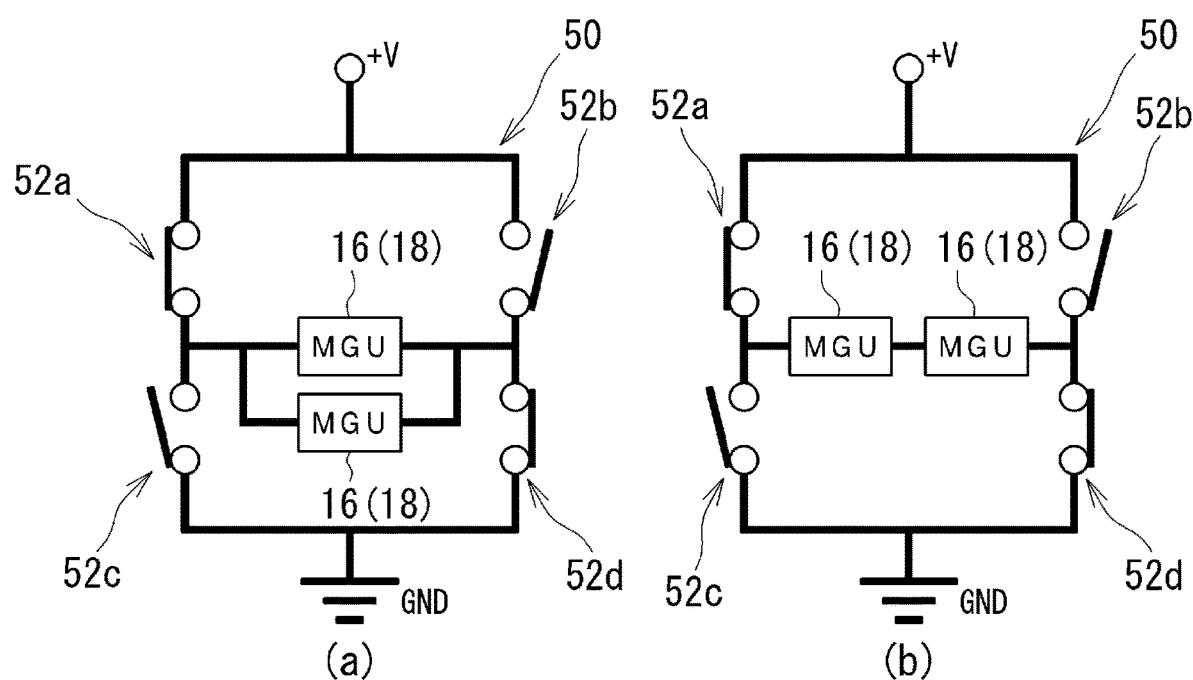
FIG. 2 are circuit diagrams for schematically illustrating circuit configurations of the electric brake device according to the embodiment of the present invention.

In this case, FIG. 2(a) shows an H-bridge circuit 50 in which two MGUs 16 are connected in parallel to one drive circuit 32. The connection of each drive circuit 32 in the first embodiment illustrated in FIG. 1 corresponds to the H-bridge circuit 50 of FIG. 2(a). With reference to FIG. 1 and FIG. 2(a), an action of the electric brake device 10 of the first embodiment is described. First, when the parking brake is to be applied, switches 52a to 52d of the H-bridge circuit 50 are controlled into a state illustrated in FIG. 2(a), that is, the switches 52a and 52d are brought into an ON state and the switches 52b and 52c are brought into an OFF state. Under this state, currents flow through the two MGUs 16 in a forward direction from the left side to the right side of the drawing. For example, when +V is +12 V, a voltage of +12 V is applied to the two MGUs 16. Then, the electric mechanism 18 of each of the two MGUs 16 is rotated in a forward rotation direction so that a force of pressing the piston 26 is generated via the MGU 16 and the actuator 24. As a result, the brake pad 28 is pressed against a rotor (not shown) so that a braking force is applied to the wheel.

On the other hand, when the parking brake is to be released, the switches 52a to 52d of the H-bridge circuit 50 are switched from the state illustrated in FIG. 2(a) to a state in which the switches 52a and 52d are brought into the OFF state and the switches 52b and 52c are brought into the ON state. Under this state, currents flow through the two MGUs 16 in a reverse direction from the right side to the left side of the drawing. For example, when +V is +12 V, a voltage of +12 V is applied to the two MGUs 16. Then, the electric mechanism 18 of each of the two MGUs 16 is rotated in a reverse rotation direction so that a force of pulling back the piston 26 is generated via the MGU 16 and the actuator 24. As a result, the brake pad 28 is separated away from the rotor (not shown), and the braking force applied to the wheel is canceled. In this manner, application and cancelation of the braking force with respect to any one of the right and left wheels are achieved by the output from one drive circuit 32. The switches 52a to 52d are implemented by being incorporated in the drive circuit 32 illustrated in FIG. 1.

Figure 3:
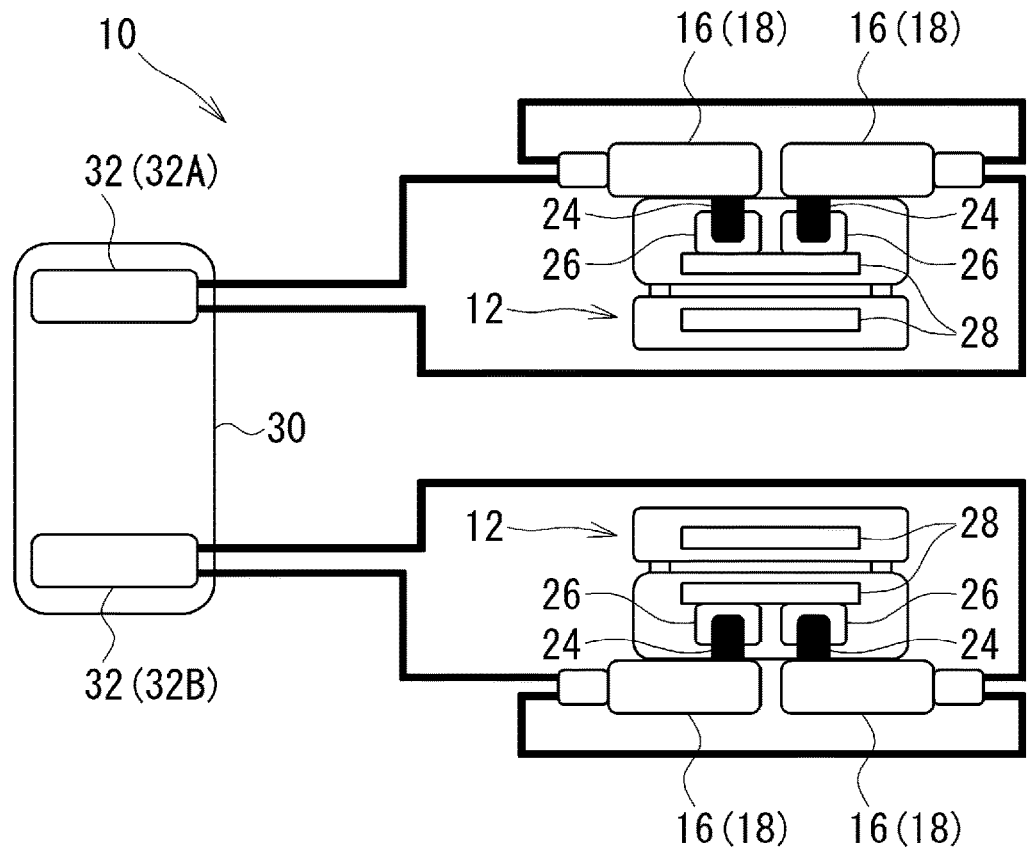
FIG. 3 is a connection image view for schematically illustrating a configuration of a second embodiment of the electric brake device according to the embodiment of the present invention.

Next, FIG. 3 shows a configuration of a second embodiment of the electric brake device 10 according to the embodiment of the present invention. This second embodiment is applied to a case in which, for example, a battery voltage of a vehicle is higher than an assumed voltage (for example, +24 V). In the electric brake device 10 of the second embodiment, similarly to the electric brake device 10 of the first embodiment illustrated in FIG. 1, the output of the first drive circuit 32A is connected so as to drive the two electric mechanisms 18 included in the caliper 12 of one wheel, and the output of the second drive circuit 32B is connected so as to drive the two electric mechanisms 18 included in the caliper 12 of another wheel. However, unlike the first embodiment, each of the first and second drive circuits 32A and 32B is connected in series to the two electric mechanisms 18 of each caliper 12.

In this case, FIG. 2(b) shows an H-bridge circuit 50 in which two MGUs 16 are connected in series to one drive circuit 32. The connection of each drive circuit 32 in the second embodiment illustrated in FIG. 3 corresponds to the H-bridge circuit 50 of FIG. 2(b). With reference to FIG. 2(b) and FIG. 3, an action of the electric brake device 10 of the second embodiment is briefly described. First, when the parking brake is to be applied, the switches 52a to 52d of the H-bridge circuit 50 are controlled into a state illustrated in FIG. 2(b), that is, the switches 52a and 52d are brought into the ON state and the switches 52b and 52c are brought into the OFF state. Under this state, currents flow through the two MGUs 16 in the forward direction from the left side to the right side of the drawing. For example, when +V is +24 V, a voltage of +12 V dropped from +24 V is applied to each of the two MGUs 16. Then, the electric mechanism 18 of each of the two MGUs 16 is rotated in the forward rotation direction. In this manner, similarly to the first embodiment, a braking force is applied to the wheel.

On the other hand, when the parking brake is to be released, the switches 52a to 52d of the H-bridge circuit 50 are switched from the state illustrated in FIG. 2(b) to a state in which the switches 52a and 52d are brought into the OFF state and the switches 52b and 52c are brought into the ON state. Under this state, currents flow through the two MGUs 16 in the reverse direction from the right side to the left side of the drawing. For example, when +V is +24 V, a voltage of +12 V dropped from +24 V is applied to each of the two MGUs 16. Then, the electric mechanism 18 of each of the two MGUs 16 is rotated in the reverse rotation direction. In this manner, similarly to the first embodiment, the braking force applied to the wheel is canceled. Other configurations and actions of the second embodiment are similar to those of the first embodiment, and hence description thereof is omitted.

Figure 4:
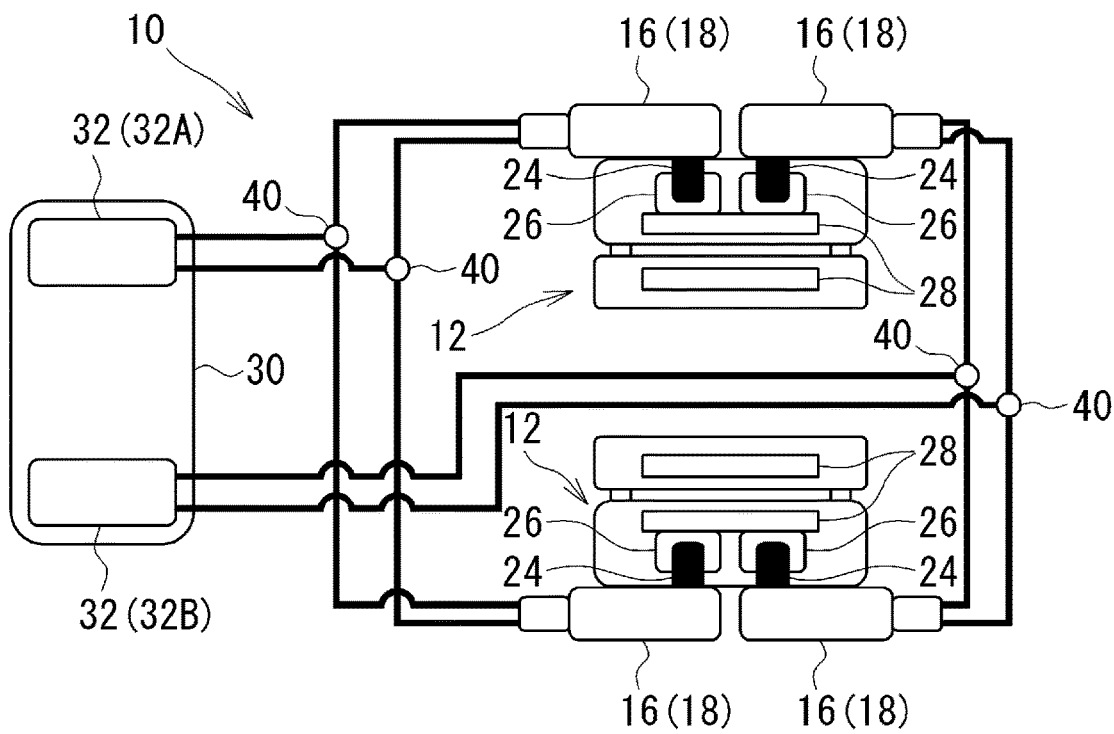
FIG. 4 is a connection image view for schematically illustrating a configuration of a third embodiment of the electric brake device according to the embodiment of the present invention.

Next, FIG. 4 shows a configuration of a third embodiment of the electric brake device 10 according to the embodiment of the present invention. The electric brake device 10 of the third embodiment is different from those of the first and second embodiments illustrated in FIG. 1 and FIG. 3 in that the output of the first drive circuit 32A is connected so as to drive one electric mechanism 18 included in the caliper 12 of one wheel and one electric mechanism 18 included in the caliper 12 of another wheel, and the output of the second drive circuit 32B is connected so as to drive another electric mechanism 18 included in the caliper 12 of the one wheel and another electric mechanism 18 included in the caliper 12 of the another wheel.

Further, each of the first and second drive circuits 32A and 32B is connected in parallel to the two electric mechanisms 18, that is, one electric mechanism 18 included in one caliper 12 and one electric mechanism 18 included in another caliper 12, via branching points 40. That is, the connection between the output of one drive circuit 32 and two electric mechanisms 18 corresponds to the parallel H-bridge circuit 50 illustrated in FIG. 2(a), similarly to the first embodiment. Accordingly, detailed description of the action of the third embodiment is omitted, but the third embodiment is different from the first embodiment in that the output from one drive circuit 32 applies a braking force not to any one of the right and left wheels but to both of the right and left wheels.

Figure 5:
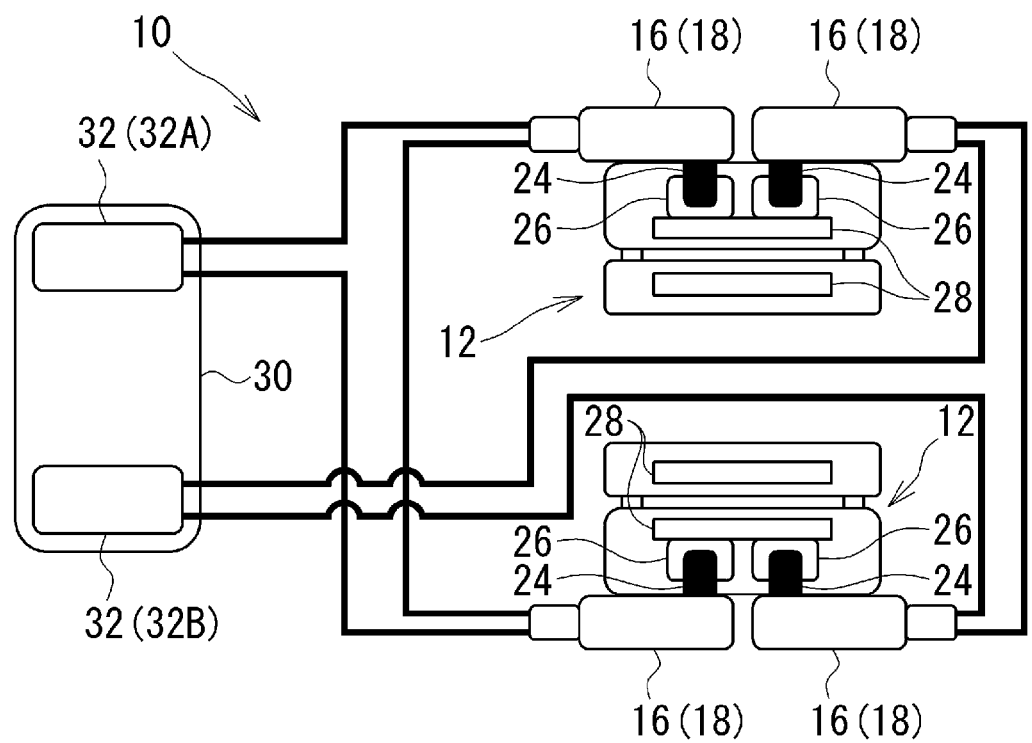
FIG. 5 is a connection image view for schematically illustrating a configuration of a fourth embodiment of the electric brake device according to the embodiment of the present invention.

Further, FIG. 5 shows a configuration of a fourth embodiment of the electric brake device 10 according to the embodiment of the present invention. Similarly to the second embodiment, the fourth embodiment is applied to a case in which, for example, a battery voltage of a vehicle is higher than the assumed voltage. Specifically, in the electric brake device 10 of the fourth embodiment, similarly to the electric brake device 10 of the third embodiment illustrated in FIG. 4, the output of the first drive circuit 32A is connected so as to drive one electric mechanism 18 included in the caliper 12 of one wheel and one electric mechanism 18 included in the caliper 12 of another wheel, and the output of the second drive circuit 32B is connected so as to drive another electric mechanism 18 included in the caliper 12 of the one wheel and another electric mechanism 18 included in the caliper 12 of the another wheel.

However, the fourth embodiment is different from the third embodiment in that each of the first and second drive circuits 32A and 32B is connected in series to the two electric mechanisms 18, that is, one electric mechanism 18 included in one caliper 12 and one electric mechanism 18 included in another caliper 12. That is, the connection between the output of one drive circuit 32 and two electric mechanisms 18 corresponds to the series H-bridge circuit 50 illustrated in FIG. 2(b), similarly to the second embodiment. Accordingly, detailed description of the action of the fourth embodiment is omitted, but the fourth embodiment is different from the second embodiment in that the output from one drive circuit 32 applies a braking force not to any one of the right and left wheels but to both of the right and left wheels.

As described above, as illustrated in FIG. 1 and FIG. 3 to FIG. 5, the electric brake device 10 according to the embodiment of the present invention includes one caliper 12 including at least two electric mechanisms 18 each configured to apply a braking force to a vehicle and to maintain the braking force. Further, the at least two electric mechanisms 18 are to be driven by one drive circuit output, that is, one output from one drive circuit 32. In this manner, even when it is required to control a large number of electric mechanisms 18 as in the case in which the present invention is applied to, for example, a twin-bore caliper 12, the number of drive circuits 32 for driving the electric mechanisms 18 can be reduced, thereby being capable of reducing the cost.

Further, in the electric brake device 10 according to the embodiment of the present invention, the at least two electric mechanisms 18 are connected in series to the one drive circuit output as illustrated in FIG. 2(b), FIG. 3, and FIG. 5. In this manner, each of the electric mechanisms 18 is to be driven by a dropped voltage. Thus, for example, even when the present invention is applied to a vehicle having a battery voltage higher than the assumed voltage, each of the electric mechanisms 18 can be driven with the input voltage being dropped. Accordingly, the input voltage can be effectively used, and, for example, it is unrequired to re-design the electric mechanism 18 in accordance with the input voltage.

As another example, in the electric brake device 10 according to the embodiment of the present invention, as illustrated in FIG. 2(a), FIG. 1, and FIG. 4, the at least two electric mechanisms 18 may be connected in parallel to the one drive circuit output. With this connection, the at least two electric mechanisms 18 can be simultaneously driven without dropping the voltage to be applied to each of the electric mechanisms 18.

Further, in the electric brake device 10 according to the embodiment of the present invention, as illustrated in FIG. 4 and FIG. 5, the caliper 12 including two electric mechanisms 18 is provided to each of the right and left wheels on the front side or the rear side, and the electric brake device 10 according to the embodiment of the present invention includes four electric mechanisms 18 in total. Further, all of those four electric mechanisms 18 are to be driven by two drive circuit outputs. Specifically, one of the two electric mechanisms 18 of the caliper 12 on the right wheel side and one of the two electric mechanisms 18 of the caliper 12 on the left wheel side are to be driven by one of the two drive circuit outputs. Further, another one of the two electric mechanisms 18 of the caliper 12 on the right wheel side and another one of the two electric mechanisms 18 of the caliper 12 on the left wheel side are to be driven by another one of the two drive circuit outputs.

At this time, two electric mechanisms 18 are connected to one drive circuit output, but this connection may be series connection as illustrated in FIG. 2(b) or parallel connection as illustrated in FIG. 2(a). With such a configuration, the parking brake can achieve redundancy. For example, even when one drive circuit 32 fails due to disconnection or the like, the output from the remaining another drive circuit 32 can drive one electric mechanism 18 of each of both the right and left wheels, and hence the braking force can be applied with good balance. In addition, when the timing of the one drive circuit output and the timing of the another drive circuit output are intentionally shifted from each other, the timings to apply the braking force to both of the right and left wheels can be matched while dispersing inrush currents.

In this case, the electric brake device 10 according to the embodiment of the present invention is not limited to the configurations illustrated in FIG. 1 to FIG. 5, and may have any configuration as long as the electric brake device 10 is configured so that at least two electric mechanisms 18 are to be driven by one drive circuit output. For example, the number of electric mechanisms 18 to be driven by one drive circuit output may be three or more. Further, a part of the components of the electric brake device 10 illustrated in FIG. 1 to FIG. 5 may be omitted or changed, or new components may be added thereto. In addition, as each component, any component that can implement the function demanded for each component can be used.

As the electric brake device 10 based on this embodiment, which has been described above, for example, modes described below are conceivable.

As a first mode, there is provided the electric brake device (10) including: the electric mechanism (18) which is to be driven by the drive circuit (32), and is configured to apply the braking force to the vehicle and to maintain the braking force; and one caliper (12) including at least two electric mechanisms (18), wherein the at least two electric mechanisms (18) are to be driven by one drive circuit (32) output.

As a second mode, in the first mode, the at least two electric mechanisms (18) are connected in series to the one drive circuit (32) output.

As a third mode, in the first mode, the at least two electric mechanisms (18) are connected in parallel to the one drive circuit (32) output.

As a fourth mode, in the first to third modes, the caliper (12) including two electric mechanisms (18) is provided to each of a right wheel and a left wheel, and all of the electric mechanisms (18) are to be driven by two drive circuit (32) outputs. One electric mechanism (18) of the caliper (12) on the right wheel side and one electric mechanism (18) of the caliper (12) on the left wheel side are to be driven by one drive circuit (32) output, and another electric mechanism (18) of the caliper (12) on the right wheel side and another electric mechanism (18) of the caliper (12) on the left wheel side are to be driven by another drive circuit (32) output.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-118668 filed on Jun. 26, 2019. All disclosed contents including Specification, Scope of Claims, Drawings, and Abstract of Japanese Patent Application No. 2019-118668 filed on Jun. 26, 2019 are incorporated herein by reference in their entirety.

REFERENCE SIGNS LIST

10: electric brake device, 12: caliper, 18 electric mechanism, 32: drive circuit

The invention claimed is:

1. An electric brake device, comprising:
an electric mechanism which is to be driven by a drive circuit, and is configured to apply a braking force to a vehicle and to maintain the braking force; and one caliper including at least two electric mechanisms,
wherein the at least two electric mechanisms are to be driven by the output from one drive circuit,
wherein the caliper including the two electric mechanisms is provided to each of a right wheel and a left wheel,
wherein all of the electric mechanisms are to be driven by two drive circuit outputs,
wherein one electric mechanism of the caliper on the right wheel side and one electric mechanism of the caliper on the left wheel side are to be driven by one drive circuit output,
wherein another electric mechanism of the caliper on the right wheel side and another electric mechanism of the caliper on the left wheel side are to be driven by another drive circuit output, and
wherein the timing of the one drive circuit output and the timing of the another drive circuit output are shifted from each other.

2. The electric brake device according to claim 1, wherein the at least two electric mechanisms are connected in series to the one drive circuit output.

3. The electric brake device according to claim 1, wherein the at least two electric mechanisms are connected in parallel to the one drive circuit output.

\* \* \* \* \*